(12) United States Patent
Dean (10) Patent No.: US 12,100,090 B1
(45) Date of Patent: Sep. 24, 2024

(54) SYSTEMS AND METHODS FOR AUTOMATICALLY ADDING INTERACTIVITY TO A THREE-DIMENSIONAL SCENE

(71) Applicant: Illuscio, Inc., Culver City, CA (US)

(72) Inventor: Kevin Edward Dean, Greenwood, IN (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/519,171

(22) Filed: Nov. 27, 2023

(51) Int. Cl.
| | | |
|---|---|---|
| *G06T 13/40* | (2011.01) | |
| *G06F 3/048* | (2013.01) | |
| *G06N 3/045* | (2023.01) | |
| *G06T 7/33* | (2017.01) | |
| *G06T 7/50* | (2017.01) | |
| *G06T 11/20* | (2006.01) | |

(Continued)

(52) U.S. Cl.
CPC ............ *G06T 13/40* (2013.01); *G06T 17/005* (2013.01); *G06V 10/764* (2022.01)

(58) Field of Classification Search
CPC ....... G06T 13/40; G06T 13/20; G06T 17/005; G06T 11/206; G06T 11/001; G06T 19/20; G06T 3/40; G06T 2207/10028; G06T 7/344; G06T 7/33; G06T 7/73; G06T 7/50; G06T 7/55; G06T 7/75; G06T 7/579; G06T 7/11; G06T 2210/56; G06T 2219/2012; G06T 2207/10024; G06T 19/003; G06T 17/05; G06T 2207/10016; G06T 2207/20081–20084; G06T 2207/20092; G06T 2213/00–12; G06V 10/764; G06V 10/774; G06V 10/7715; G06V 10/26; G06V 10/40–41; G06V 20/20; G06V 20/46; G06V 20/49; G06V 20/64; G06V 20/647; G06V 20/70; G06V 40/16; G06N 3/045; G06N 3/08; G06N 3/084; G06F 3/048; G06F 18/2148; G06F 18/213; G06F 18/2415
See application file for complete search history.

(56) References Cited

U.S. PATENT DOCUMENTS

| | | | |
|---|---|---|---|
| 11,227,432 B1 | 1/2022 | Bogacz et al. | |
| 11,302,070 B1 * | 4/2022 | Bogacz | G06T 19/00 |

(Continued)

*Primary Examiner* — Wesner Sajous
(74) *Attorney, Agent, or Firm* — Ansari Katiraei LLP; Arman Katiraei; Sadiq Ansari (57) ABSTRACT

A three-dimensional ("3D") interactive system and associated methods automatically add interactivity to a 3D scene by detecting and segments the primitives that represent different objects in the 3D scene, associating different animation models to the primitives of the represented objects, and separately animating the primitives of a represented object in response to a user interaction with one or more of those primitives based on the associated animation model. The system receives an undifferentiated 3D model of the scene, selects different sets of primitives that share unique commonality associated with different objects, and generates a differentiated 3D model with a different classification for each set of the different sets of primitives that represent a different object. The system detects an interaction with primitives of a particular classification, and animates the primitives according to an animation model that is defined for an object identified with the particular classification.

20 Claims, 7 Drawing Sheets

(51) Int. Cl.
    *G06T 13/20*     (2011.01)
    *G06T 17/00*     (2006.01)
    *G06T 19/20*     (2011.01)
    *G06V 10/764*     (2022.01)
    *G06V 10/77*     (2022.01)
    *G06V 20/20*     (2022.01)

(56) References Cited

U.S. PATENT DOCUMENTS

| | | | | |
|---|---|---|---|---|
| 11,488,360 | B1* | 11/2022 | Good | G06T 19/00 |
| 11,803,994 | B2* | 10/2023 | Peake, III | G06T 11/206 |
| 2014/0049547 | A1* | 2/2014 | Cabanier | G06T 13/00 |
| | | | | 345/473 |
| 2020/0217937 | A1* | 7/2020 | Mammou | G06T 9/004 |
| 2022/0076408 | A1* | 3/2022 | Choi | G06T 17/00 |
| 2022/0375162 | A1* | 11/2022 | Monaghan | G06T 19/20 |
| 2023/0215092 | A1* | 7/2023 | Kim | G06V 20/64 |
| | | | | 345/419 |

* cited by examiner

SYSTEMS AND METHODS FOR AUTOMATICALLY ADDING INTERACTIVITY TO A THREE-DIMENSIONAL SCENE

Three-dimensional ("3D") scenes may be captured with scanners, cameras, or other imaging equipment. The captured 3D scene may be recreated and/or represented as a 3D model formed by meshes, polygons, points, and/or other primitives. In other words, a digital representation of an actual 3D scene may be generated from scanning the actual 3D scene and from defining primitives to recreate the surfaces, objects, and/or features of the actual 3D scene in a virtual 3D space.

The 3D model representing the actual 3D scene becomes one undifferentiated model of all the different surfaces, objects, and/or features of the actual 3D scene. For instance, creating the 3D model may include generating primitives wherever a surface is detected when scanning the 3D scene without differentiating between what object that surface belongs to and without differentiating between the primitives that represent different objects in the 3D scene. Consequently, individual objects represented in the 3D model cannot be interacted with separately from other objects in the 3D model without a user manually selecting primitives that represent each object, segmenting those primitives from other objects, and defining animation or other rules for the interactivity of each object that is represented by the manually segmented set of primitives.

DETAILED DESCRIPTION OF PREFERRED EMBODIMENTS

The following detailed description refers to the accompanying drawings. The same reference numbers in different drawings may identify the same or similar elements.

Provided are systems and associated methods for automatically adding interactivity to a three-dimensional ("3D") scene. The systems and associated methods automatically add the interactivity without human intervention by leveraging artificial intelligence and/or machine learning ("AI/ML") techniques. Specifically, the systems and associated methods detect sets of primitives in a 3D model of a represented 3D scene that match the uniquely identifying shapes, forms, visual characteristics, and/or other differentiating commonality of different objects, segment the different sets of primitives, classify the object represented by each segmented set of primitives, associate an animation model for each classified object to the set of primitives representing that object, generate enhanced animation frameworks for the set of primitives based on the animation models, and animate the set of primitives representing a particular object separately from other primitives of the 3D model in response to a user interaction with that particular object and the animation response that the enhanced animation framework generates for that particular object based on the user interaction. Animating the set of primitives may include relighting, color correcting, and/or otherwise adjusting color attributes of the set of attributes based on material properties associated with the classification of the particular object.

The systems and associated methods may be collectively implemented as a 3D interactive system. The 3D interactive system takes a monolithic representation of a complex 3D scene involving multiple objects or interactive components, automatically applies different lifelike and/or realistic movements that are modeled for those objects or interactive components to the primitives that represent each object or component, and/or automatically adjusts lighting, colors, and/or other visual characteristics of the primitives based on modeled lighting reactivity associated with the objects or interactive components. The 3D interactive system frees the user from the near impossible task of selecting each and every polygon, mesh, point, or other primitive that form different objects or interactive components in the 3D model, and then separately defining the animation or animation response that controls the movement of each selected primitive of an object in response to different user interactions with that primitive or a represented object or interactive component including that primitive. Consequently, the 3D interactive system rapidly generates realistic 3D environments with accurate and/or lifelike animation from scanning a physical or actual 3D scene that includes the animated objects or interactive components. In other words, the 3D interactive system generates virtual reality, augmented reality, mixed reality, and/or other 3D environments with objects or interactive components that mirror the objects or interactive components in the represented physical or actual 3D scene. Graphic artists no longer need to spend hours upon hours to digitally create a 3D model that attempts to mirror the look and feel of each desired object or interactive component, painstakingly define bones, muscles, skin, and/or other animation elements for an animation framework that attempts to simulate the movements of the objects represented by the digitally created 3D models, and then introduce each created 3D model with its animation framework in a 3D space to try and replicate the physical or actual 3D scene as close as possible.

Figure 1:
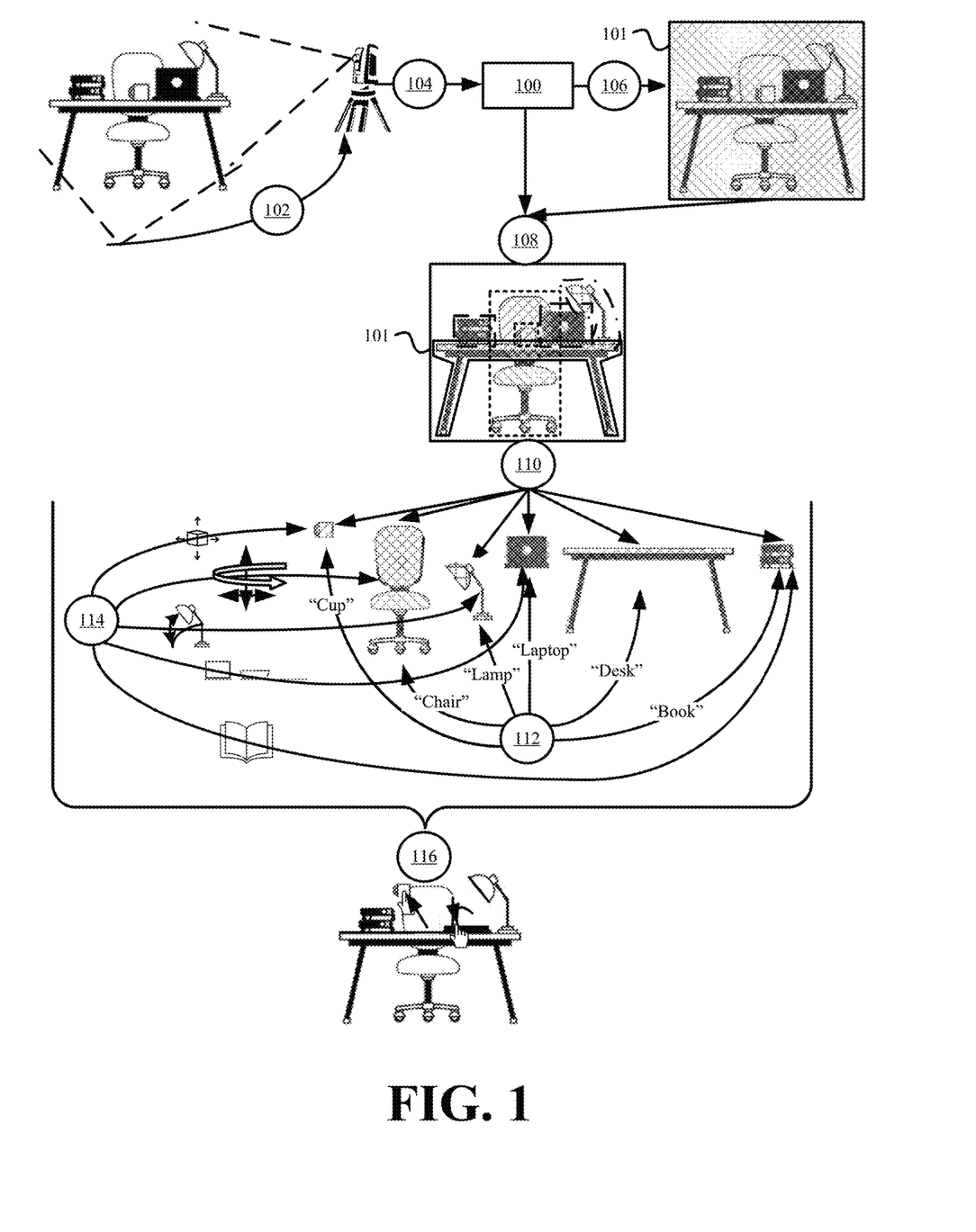
FIG. 1 illustrates an example of automatically adding interactivity to a three-dimensional ("3D") scene in accordance with some embodiments presented herein.

FIG. 1 illustrates an example of automatically adding interactivity to a 3D scene in accordance with some embodiments presented herein. The 3D scene is scanned (at 102) or imaged with one or more scanners, cameras, or other imaging equipment. For instance, a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments may be used to scan the 3D scene and generate precise 3D model 101 of the 3D scene. The scanning (at 102) includes accurately measuring the positions of different surfaces or features in the 3D scene, measuring the visual characteristics (e.g., colors, reflectivity, opacity, etc.) at each measured position, and generating meshes, polygons, points, or other primitives at positions in a virtual 3D space based on the measured positions and with visual characteristics based on the measured visual characteristics. The scan results are used to create 3D model 101 that accurately matches the positions and visual characteristics of the surfaces found within the 3D scene.

In some embodiments, the scan results are used to create a mesh model of the 3D scene. The mesh model is defined as a set of connected meshes or polygons that collectively recreate the 3D forms of the surfaces, objects, and/or features within the 3D scene at their respective positions and that are colored to precisely match the coloring at those same positions.

In some other embodiments, the scan results are used to create a point cloud representation of the 3D scene. The point cloud is defined with a set of disconnected points that are distributed in a 3D space at positions corresponding to positions at which surfaces, objects, or features of the 3D scene are detected, and that are presented at the defined positions in the 3D space with visual characteristics that match the visual characteristics detected at the corresponding positions in the actual 3D scene.

In some embodiments, two or more devices may be used to scan (at 102) the 3D scene and/or generate 3D model 101 of the 3D scene. For instance, a first imaging device (e.g., a LiDAR sensor) may determine the position for each point of a point cloud representation, and a second imaging device (e.g., a high-resolution camera) may measure or capture the characteristics or other non-positional information for each point. One or more photogrammetry techniques may be used to consolidate the data from the first imaging device and the second imaging device, and to create the point cloud representation.

In some embodiments, 3D interactive system 100 receives (at 104) the scan results (e.g., positional measurements and capture of the visual characteristics), and defines (at 106) the primitives (e.g., polygons, meshes, points, etc.) of 3D model 101 that accurately recreate or represent the surfaces, objects, or features of the 3D scene in a virtual or digital 3D space. In some other embodiments, 3D interactive system 100 receives (at 104) 3D model 101 with the defined primitives directly from the imaging equipment that was used to scan (at 102) the 3D scene. In some such embodiments, the imaging equipment processes the scan measurements, and outputs 3D model 101 instead of the raw measurements.

3D interactive system 100 detects (at 108) differentiable objects or interactive components in 3D model 101. To detect (at 108) the differentiable objects or interactive components, 3D interactive system 100 may render 3D model 101, and may compare the rendered visualizations to shapes, forms, and/or coloring of known objects or interactive components. In some embodiments, 3D interactive system 100 uses one or more object recognition and/or AI/ML techniques to perform the object or interactive component detection and/or differentiation.

3D interactive system 100 selects (at 110) the different sets of primitives from the 3D model that form each differentiated object or interactive component. The detection (at 108) identifies objects or interactive components based on unique differentiating shapes, forms, or coloring found in the rendered visualization of 3D model 101, whereas the selection (at 110) involves identifying and selecting the individual primitives that define the entire shape and form of the differentiated objects or interactive components. In other words, 3D interactive system 100 automatically selects (at 110) all the primitives that represent a particular object or interactive object. For instance, a 3D model may include primitives that collectively represent a vehicle. 3D interactive system 100 may select (at 110) different sets of primitives that represent each of the vehicle wheels, windows, doors, trunk, hood, and/or other interactive or separately animated components of the vehicle.

3D interactive system 100 classifies (at 112) the object or interactive component that is represented by each selected (at 110) set of primitives. The classification (at 112) includes identifying the represented object or interactive component, and associating a tag or other identifier to each primitive of the set of primitives selected (at 110) for that object or interactive component. Accordingly, the set of primitives representing a cup may be tagged with a "cup" identifier, and the set of primitives representing a desk may be tagged with a "desk" identifier. The tagging may include adding the identifier to the primitive metadata or to a non-positional element of the primitive.

3D interactive system 100 associates (at 114) an animation model to each set of primitives based on the classification of the object or interactive component represented by that set of primitives. The animation model for a set of primitives defines different movements or animations to individual primitives of that set of primitives in response to different user interactions with that set of primitives. For instance, the animation model for the primitives tagged with the "laptop" identifier may specify an opening and closing animation for the tagged set of primitives, and the animation model for the primitives tagged with the "chair" identifier may specify a rotation of a tagged subset of primitives representing the seat and backrest of the chair, a rolling rotation for all primitives representing the chair, and up and down movements for the subset of primitives forming the seat and backrest.

Other animation models may specify simpler or more complex animations and/or different animations in response to different interactions. For instance, an animation model for a cup may specify a simple collective movement of the set of primitives, and a more complex shattering animation if the set of primitives are detected to collide with another rigid object.

3D interactive system 100 animates (at 116) the different sets of primitives representing the differentiated objects or interactive components of the 3D model separately according to the object differentiation, classification, and animation model association. Therefore, if a user was to interact with a first differentiated object, 3D interactive system 100 generates a first animation that moves, repositions, or adjusts the first differentiated object based on animation that is defined for that interaction and the first differentiated object in the animation model of the first differentiated object. The user may interact with a second differentiated object in the same exact manner. However, 3D interactive system 100 may generate a different second animation for the second differentiated object because the animation model for the second differentiated object specifies a different movement, adjustment, or animation of the second differentiated object in response to the user interaction than the animation model for the first differentiated object.

Animating (at 116) the different sets of primitives may include adjusting the lighting and/or visual characteristics (e.g., colors) of each set of primitives independently based on different light reactivity that the classified (at 112) objects or interactive components have. For instance, if a user was to interact with a first differentiated object, 3D interactive system 100 may adjust the lighting and/or visual characteristics of the primitives representing that first differentiated object differently than if the user was to interact with a second differentiated object that has a different classification than the first differentiated object. More specifically, 3D interactive system 100 may add or increase reflections and/or brightness of the primitives representing the first differentiated object when the first differentiated object corresponds to a reflective or shiny object, and may keep or reduce reflections and/or brightness of the primitives representing the second differentiated object when the second differentiated object corresponds to a matte or dull object.

By automatically differentiating and selecting the different sets of primitives that correspond to different objects and interactive components of the scanned office environment and associating animation models to the differentiated sets of primitives, 3D interactive system 100 introduces realistic interactivity to 3D model 101. Specifically, differentiated 3D model 101 generated by 3D interactive system 100 may be inserted into a virtual reality, mixed reality, augmented reality, or other 3D environment such that 3D interactive system 100 generates realistic, distinct, and accurate animations for the differentiated objects or components in response to user interactions with the primitives of those differentiated objects or components.

Figure 2:
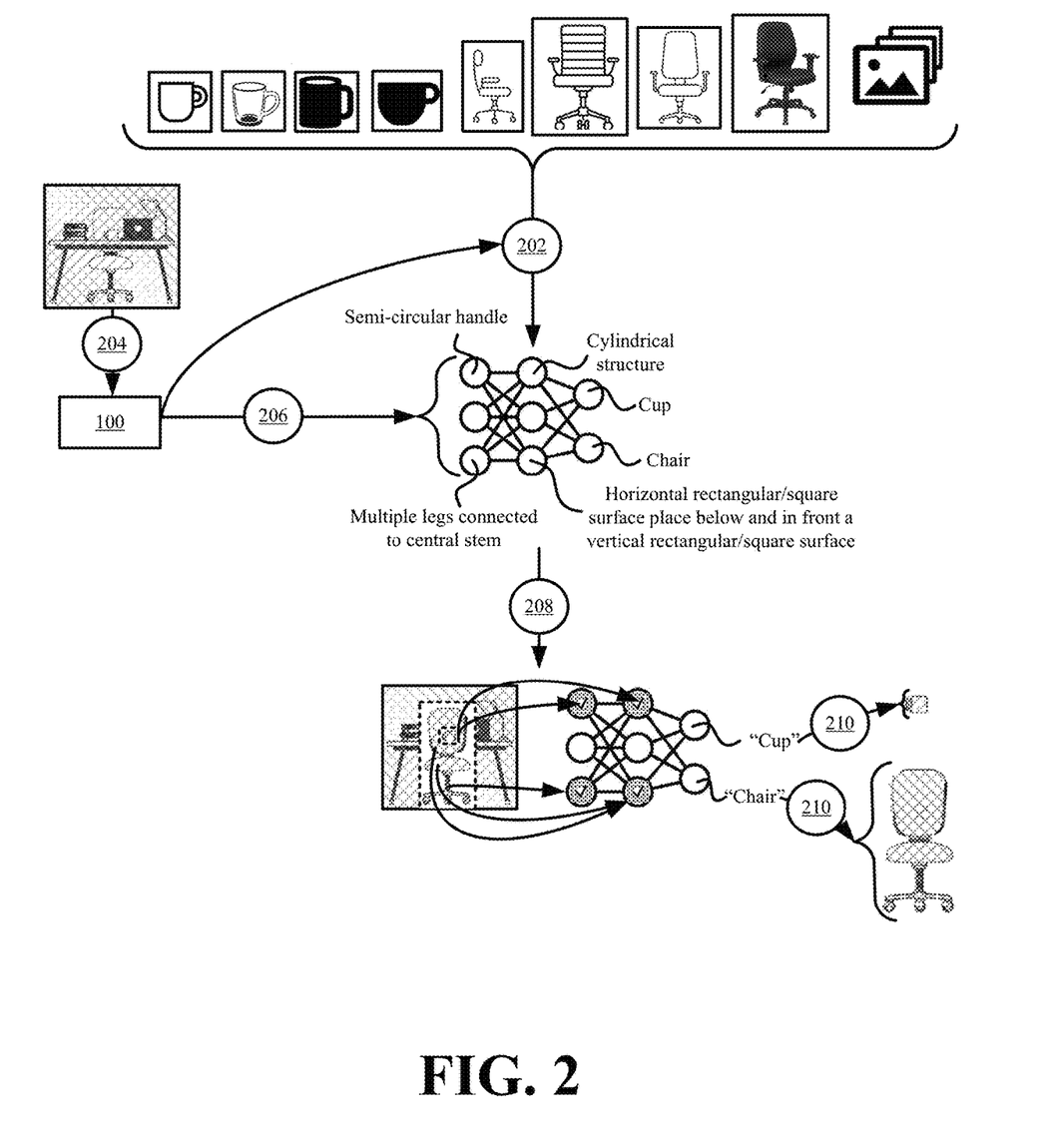
FIG. 2 illustrates an example of performing the automated detection and segmentation of objects or interactive components from a 3D model in accordance with some embodiments presented herein.

FIG. 2 illustrates an example of performing the automated detection and segmentation of objects or interactive components from a 3D model in accordance with some embodiments presented herein. 3D interactive system 100 may use machine learning to train (at 202) one or more neural networks to detect and/or differentiate objects or interactive components of objects based on different images of the same object or interactive component. In some embodiments, the neural network is trained using a supervised machine learning technique with a tagged set of images. The image tags identify or provide a classification for the object or interactive component represented in the image. In some other embodiments, the neural network is trained according to an unsupervised machine learning technique and untagged images. In some such embodiments, the unsupervised machine learning technique detects the commonality that differentiates between different objects or interactive components appearing in the inputted images, and generates a different identifier to the different objects or interactive components.

In any case, the machine learning and neural network training (at 202) involves selecting different images of the same object or interactive component. For supervised machine learning, the selection of a set of images may be based on each image in the set of images having the same classification, label, or tag. For unsupervised machine learning, the selection of a set of images may be based on AI/ML techniques that perform object recognition and assign labels to the images or based on image comparison to detect similar objects or interactive components in the unlabeled images. The object or interactive component in a selected set of images may have different coloring, sizes, or other dimensional variances but share a majority of other features or have a disproportionate amount of commonality in terms of the object or interaction component structure and visual characteristics.

The machine learning and neural network training (at 202) further involves analyzing the images in each set of images, and detecting different structural and/or visual characteristic commonality for the object or interactive component represented in the set of images. The detected structural commonality may include common structures, common physical arrangements, repeating patterns in the shape, material, texture, or form of the represented object or interactive component, and/or other commonality in composition, construction, or organization of the represented object or interactive component. The detect visual characteristic commonality may include common colors, reflectivity, opacity, and/or other visual attributes of the represented object or interactive component, repeating patterns with which the visual characteristics of the represented object or interactive component change, and/or other similarity found in the visual characteristics of the represented object or interactive component.

The machine learning and neural network training (at 202) further involves comparing the commonality that is detected for different objects and/or interactive components, and retaining the subset of detected commonality that uniquely differentiates an object or interactive component from other objects or interactive components. In other words, the neural network determines which of the detected commonality is not shared by other objects or interactive components, and selects the differentiating commonality for detecting those objects or interactive components in the 3D models. The retained commonality may be used to defined the synapses or connections of the neural network. Specifically, the retained commonality for detecting or differentiating a first object or interactive component may be defined as a first set of vectors in the neural, and the retained commonality for detecting or differentiating a second object or interactive component may be defined as a second set of vectors in the neural network. Each vector is defined with a connected set of synapses, and each synapse of the connected set of synapses represents a different structural attribute or visual characteristic that collectively form the differentiating commonality for detecting or differentiating a particular object or interaction component from other objects or interactive components.

To assist in the object detection and to increase the accuracy with which the neural network detects objects and interactive components within 3D models, the neural network may be tuned or biased for the detection of related objects or objects that are commonly presented together. The tuning or biasing may include analyzing images with multiple objects or interactive components. For instance, the images may be of a scene. The neural network determines the frequency with which pairs of objects are presented in the same scenes or images, and weights the detection accordingly. For instance, if a vehicle wheel is commonly presented with a vehicle door, then the neural network may bias the detection such that if the vehicle wheel is detected in a 3D model, there is higher probability that a neighboring object or interactive component is a vehicle door. Similarly, an office scene may frequently include a desk with a chair. Accordingly, if the neural network detects a form of a desk in a 3D model, then the biasing may cause the neural network to detect a chair with a higher probability even if the shape of the chair in the 3D model deviates by more than an expected threshold from the commonality defined for a chair in the neural network.

In some embodiments, the accuracy of the neural network and/or differentiated elements with which the different vectors detect objects or interactive components may be improved with reinforcement learning and/or other machine learning techniques (e.g., intersection over union) that create a feedback or self-learning loop in the neural network training. For instance, the images used to train the neural network may be input to the neural network to determine confidence or probability scores with which the objects in the images are detected or classified. The reinforcement learning may adjust the vectors or the weighting applied to the vectors, and may retain the adjustments to the neural network if the object detection accuracy improves. In other words, the neural network training may involve trial-and-error methods to refine the differentiating elements or combinations of differentiating element used to detect one object from other objects. The trial-and-error methods may include sourcing new images from the Internet or elsewhere, and continuously testing and refining the detection accuracy of the neural network based on the newly sourced images.

3D interactive system 100 receives (at 204) an undifferentiated 3D model. In some embodiments, the undifferentiated 3D model corresponds to a mesh model with a connected set of meshes or polygons that collectively represent two or more objects but that are not differentiated from one another to indicate which object a mesh or polygon is a part of or represents. In some other embodiments, the undifferentiated 3D model corresponds to a point cloud with a distributed set of disconnected points that collectively represent two or more objects but that are again not differentiated from one another to indicate which object a point is a part of or represents.

3D interactive system 100 inputs (at 206) the undifferentiated 3D model into the neural network for object or interactive component detection and segmentation. The neural network may generate a visualization of the undifferentiated 3D model by rendering the primitives that collectively define the shape and visual characteristics of the represented two or more objects. In some embodiments, the neural network may forego generating the visualization, and may determine the shape and visual characteristics of the two or more objects based on the positioning and visual characteristics of each primitive defined in the undifferentiated 3D model.

The neural network detects (at 208) different sets of primitives from the inputted (at 206) undifferentiated 3D model that have the unique differentiating commonality of different objects or interactive components. For instance, the neural network may detect (at 208) that a first set of meshes or points of the 3D model has a structural arrangement that matches by a threshold amount to a structural arrangement of a first object, and that a second set of meshes or points of the 3D model has a density, form, and/or color characteristics of a second object.

The neural network labels (at 210) each set of primitives with a classifier or identifier to indicate that that set of primitives is associated with a specific detected (at 208) object or interactive component. Labeling (at 210) each set of primitives may include adding the classifier or identifier to the metadata, non-positional element, or other data structure parameter of each primitive in the detected (at 208) set of primitives.

The classifier may directly identify the detected (at 208) object or interactive component. For instance, the classifier may be a value corresponding to a "cup", "table", "desk", "chair", "drawer", and the like. The classifier may alternatively be a generic value that does not identify the object or interactive component, but that differentiates the detected object or interactive component from other detected objects or interactive components. For instance, the generic value may be "object1", "object2", etc.

Prior to the detection (at 208) and labeling (at 210) the primitives of the 3D model were undifferentiable from one another and were related to the entirety of the 3D model rather than specific objects or interactive components within the 3D model. After the detection (at 208) and labeling (at 210), 3D interactive system 100 segments or partitions the 3D model into differentiated sets of primitives that represent different objects or interactive components.

3D interactive system 100 may then associate a different animation model to the set of primitives for each detected object or interactive component to define the interactivity for that detected object or interactive component. The animation model defines the different adjustments that are made to the set of primitives in response to different user interactions with an object or interactive component that is represented by that set of primitives. Specifically, the different adjustments model, recreate, or mimic the animations, movements, and/or changes that would happen to the object or interactive component, and map those changes to different primitives of the set of primitives used to digitally represent that object or interactive component. For instance, prior to the object detection and 3D model segmentation, the primitives of the 3D model may be rendered to present a 3D cup on a 3D table. However, since the primitives are not differentiated, a user would be unable to interact with the 3D cup separate from the 3D table. After the object detection and 3D model segmentation, 3D interactive system 100 may detect a user interaction that is applied to one or more primitives representing the 3D cup, and may animate, move, displace, or otherwise transform the automatically detected and selected primitives of the 3D cup according to the user interaction and the animation model that is associated with the 3D cup without affecting any other primitives of the 3D model (e.g., the primitives of the 3D table). The different adjustments also model the reflectivity, transparency, and other light and color reactivity that the materials of object or interactive component have, and apply that reactivity to relight and recolor the set of primitives as they are exposed to different light or lighting conditions during the animation.

Figure 3:
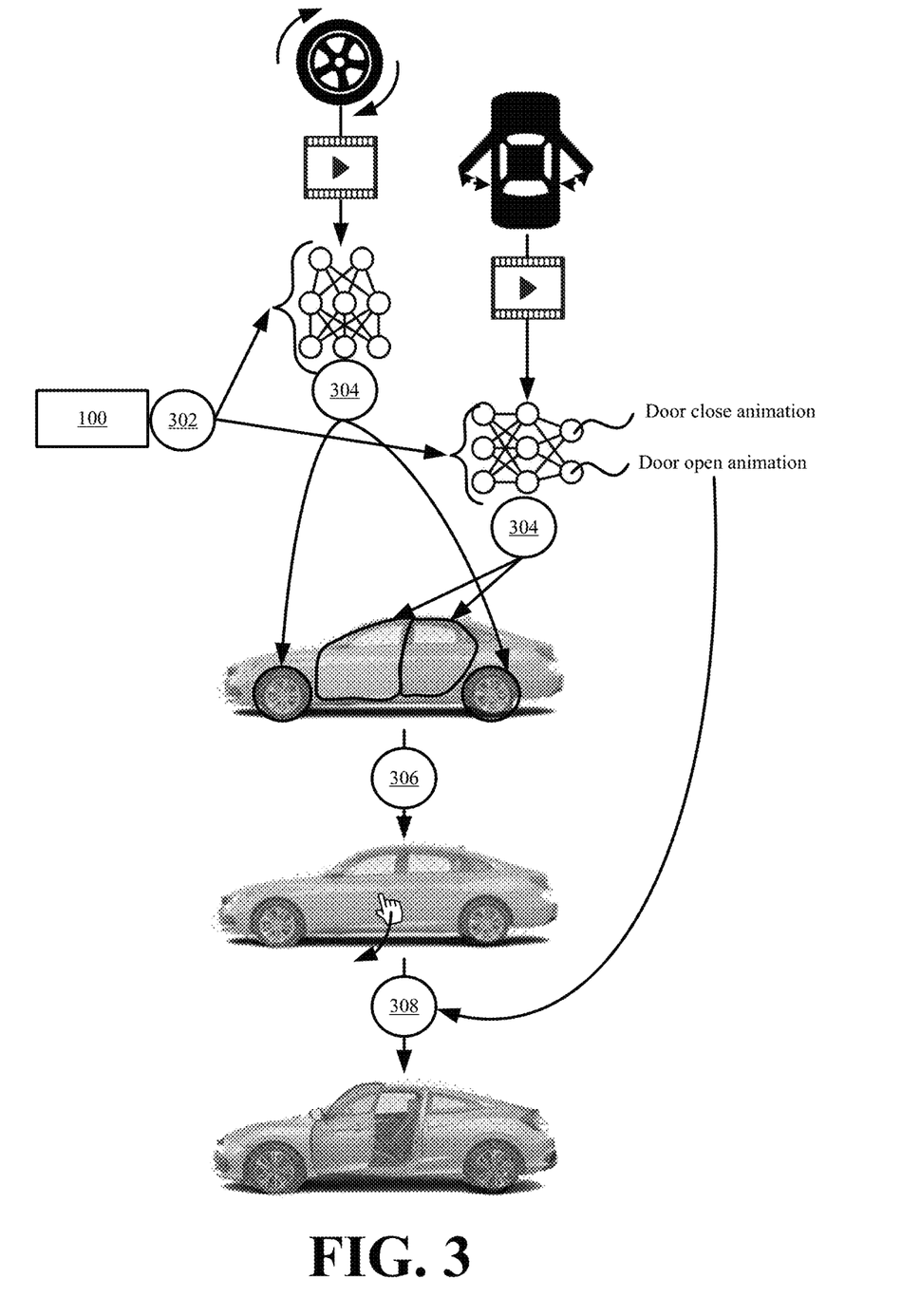
FIG. 3 illustrates an example of associating animation models to automatically segmented sets of primitives in a 3D model in accordance with some embodiments presented herein.

FIG. 3 illustrates an example of associating animation models to automatically segmented sets of primitives in a 3D model in accordance with some embodiments presented herein. 3D interactive system 100 generates (at 302) an animation model for each object or interactive component that is detected or differentiated by the neural network. Generating (at 302) the animation model for a particular object includes obtaining videos or animations of the particular object, analyzing structural and visual changes that occur to the particular object in the videos or animations in response to different interactions, and defining the animation model to capture those changes over time and to map the changes to a set of primitives representing the particular object. The animation model may include a single simple animation for all interactions with the represented object. For instance, the animation model that is generated for a cup may include collectively moving all the primitives that represent that cup in the direction of the user interaction without distorting the positioning or coloring of the primitives. The animation model may also include more complex and multiple animations for other objects. For a tree branch, the animation model may specify movements of leaves in response to wind gusts or interactions with the leaves and movements of the tree branch in response to a pull force or interactions with the tree branch. Accordingly, each vector in an animation model may specify changes or adjustments to an object or interactive component made in response to a different user interaction. The animation model may also specify different colors or wavelengths of light that are absorbed or reflected by the particular object.

3D interactive system 100 associates (at 304) an animation model to each set of primitives based on the labeling of the set of primitives and the animation model being defined for the associated label. Associating (at 304) the animation model includes mapping different animations, movements, changes, and/or interactions that are modeled for an object or interactive component to the set of primitives that represent that object or interactive component in a 3D model.

3D interactive system 100 detects (at 306) a user interaction that applies to one or more primitives from a particular set of primitives that represent a differentiated interactive component in the 3D model. 3D interactive system 100 determines that the one or more primitives are part of the particular set of primitives, and that the particular set of primitives are associated (at 304) with a particular animation model.

3D interactive system 100 adjusts (at 308) the positioning and/or visual characteristics of the one or more primitives or the particular set of primitives based on transformations and/or material properties (e.g., reactivity to different wavelength of light, reflectivity, transparency, etc.) that are defined in the particular animation model for the detected (at 306) user interaction. For instance, 3D interactive system 100 may perform a first adjustment of the particular set of primitives if the detected (at 306) user interaction involves a light or soft touch, and may perform a second adjustment of the particular set of primitives if the detected (at 306) user interaction involves a fast or hard touch in response to the particular animation model defining the first and second adjustments for these different user interactions.

For complex animations, adjusting (at 308) the positioning and/or visual characteristics of the one or more primitives or the particular set of primitives may include mapping the adjustments to specific primitives of the particular set of primitives. For instance, the particular set of primitives May represent a face of a character, and the particular animation model may define animations for moving different primitives forming the character face in order to create lifelike or realistic movements when speaking. The user interaction may include a text string or sentence. 3D interactive system 100 may enter the text string or sentence into the animation model to determine the facial animations that correctly create the sounds associated with the text string or sentence, and may map the facial animations to a subset of the particular set of primitives at relative positions identified in the particular animation model. 3D interactive system 100 may relight or recolor the animated subset of primitives based on light reactivity, color reactivity, and/or other material properties associated with skin and one or more light sources defined to illuminate those primitives.

In performing the object detection, segmentation, and animation model association, 3D interactive system 100 may manipulate and redefine the 3D model. For instance, the undifferentiated 3D model received by 3D interactive system 100 may be defined with a single tree-based representation. Specifically, the data for the 3D model, including the positional and visual characteristic data for each primitive of the 3D model, may be defined as part of a binary tree, octree, K-dimensional tree, or another tree-based format. Redefining the 3D model may include partitioning the single tree-based representation into multiple tree-based representations that are connected to one another as a mutable tree. Each of the partitioned tree-based representations includes the data for a different detected and segmented object or interactive component of the 3D model and/or the animation model that is associated with that object or interactive component.

Figure 4:
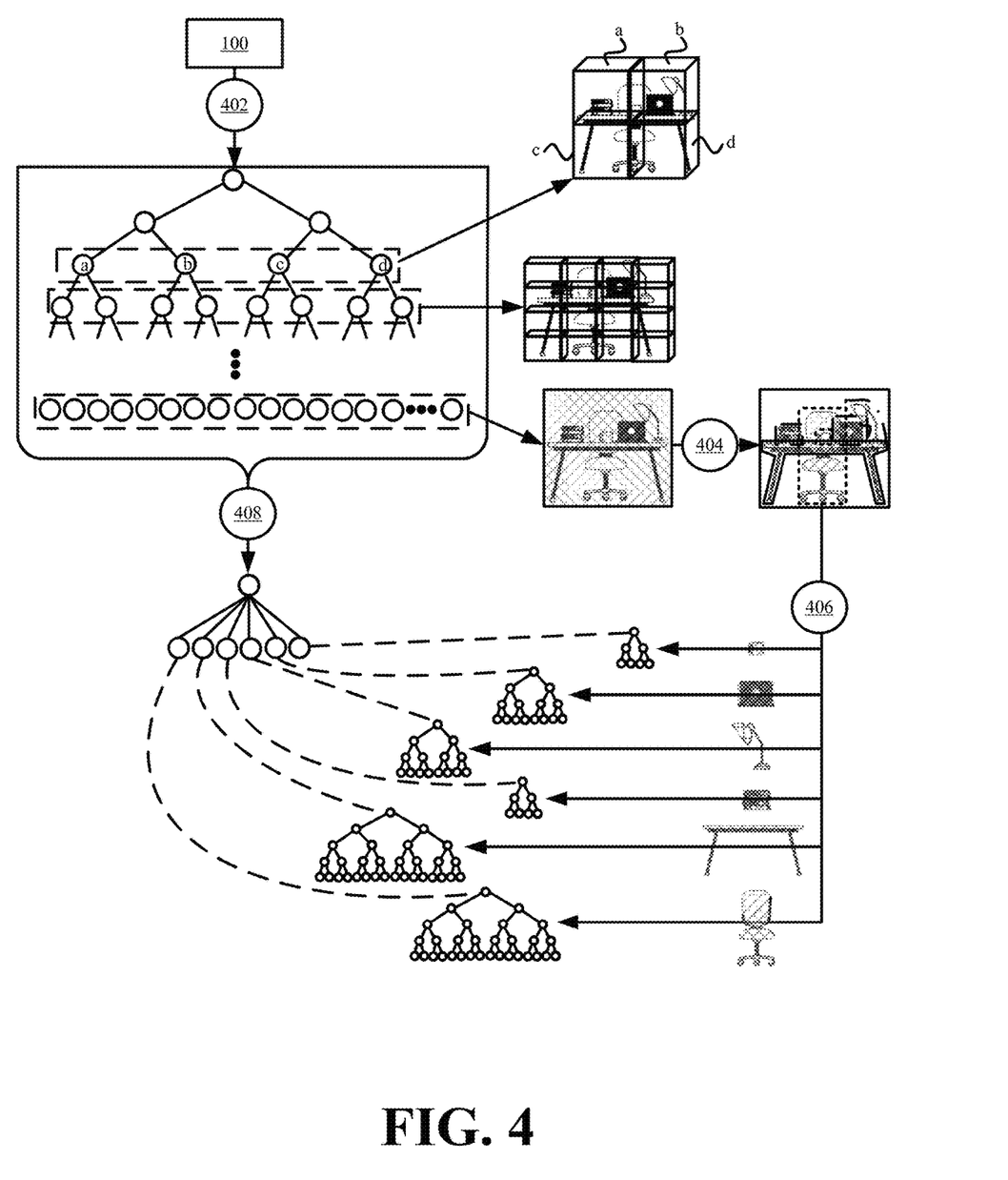
FIG. 4 illustrates an example of redefining a 3D model to automatically add interactivity to the objects or interactive components of the 3D model in accordance with some embodiments presented herein.

FIG. 4 illustrates an example of redefining a 3D model to automatically add interactivity to the objects or interactive components of the 3D model in accordance with some embodiments presented herein. 3D interactive system 100 receives (at 402) or defines an undifferentiated 3D model of a scene with two or more objects with a single tree-based representation. The single tree-based representation includes leaf nodes and parent nodes at various layers or levels above the leaf nodes.

The leaf nodes may correspond to individual primitives of the 3D model. Each leaf node may therefore be defined with the data of a different primitive of the 3D model. For instance, each leaf node may be defined with the 3D position of a primitive and with the visual characteristics of that primitive.

Each parent node directly or indirectly connects or links to two or more leaf nodes. A parent node that is connected to two or more leaf nodes may represent the region of space from the 3D model in which the primitives represented by those two or more leaf nodes are located. For instance, the root node of the tree-based representation may encompass the entire 3D space spanned by the primitives of the 3D model, 2 parent nodes may be directly linked to and under the root node and may represent two equally sized spaces or voxelized regions within the entire 3D space spanned by the 3D model, and the parent nodes at further layers down in the tree-based representation represent further subdivisions of the entire 3D space and smaller voxelized regions in the 3D space of the 3D model. Accordingly, the initial tree-based representation does not differentiate between primitives of different objects or interactive components within the 3D model, and the nodes, represented regions, or represented primitives are arranged based on their positions. In other words, primitives belonging to two different objects may be represented by leaf nodes that are connected to the same parent node.

3D interactive system 100 performs (at 404) the object or interactive component detection with the neural network and automatically selection of the different sets of primitives that represent each of the detected objects or interactive components. With the 3D model now segmented into different sets of primitives that represent distinct objects or interactive objects, 3D interactive system 100 redefines the tree-based representation after performing Redefining the tree-based representation includes generating (at 406) a separate tree-based representation for the segmented set of primitives of each detected object or interactive component. The generated subtrees represent primitives of each segmented object or interactive component from the 3D model rather than the entirety of the 3D model (e.g., all primitives of the 3D model).

Redefining the tree-based representation also includes generating (at 408) a mutable tree structure to contain and/or link the subtrees that are generated (at 406) for each detected object or interactive component. The leaf nodes of the mutable tree may correspond to the root nodes of subtrees generated for each detected object or interactive component. 3D interactive system 100 may arrange the nodes of the mutable tree according to the positioning of the detected objects or interactive objects in the 3D space of the 3D model.

With the separate subtrees defined for each detected object or interactive component, and with the mutable tree combining the subtrees, 3D interactive system 100 may quickly select the primitives for a particular object or interactive component and animate that particular object or interactive component separately without affecting the primitives of other objects. For instance, 3D interactive system 100 may detect a user interaction that affects one or more primitives that link to leaf nodes in a particular subtree. 3D interactive system 100 may isolate the particular subtree, and may adjust the primitives for the object represented by the particular subtree separately from other objects and/or primitives.

The animations for each segmented object or interactive component are defined in an animation model. 3D interactive system 100 may associate the animation model for a particular object to the root node of the subtree that is generated for the set of primitives forming that particular object. Accordingly, when a user interaction is detected with respect to one or more primitives of the particular object, 3D interactive system 100 may select the subtree with the primitives for the particular object, determine the animation model that is associated with the root node of the selected subtree, and generate visual effect of the interaction on the particular object based on the animation that is defined in the animation model for the detected interaction and the application of the detected interaction on the one or more primitives of the particular object.

In some embodiments, the associated animation model may create a realistic or lifelike animation by enhancing the subtree definition or primitives of a represented object or interactive component. In some such embodiments, the animation model may include definitions for adding, overlaying, mapping, or applying muscles, skin, and/or other animation elements to the primitives, and generating the animation based on movements or modeled animations defined for the muscles, skin, and/or other animation elements. In other words, the animation model may not directly specify adjustments for the primitives of an object. Instead, the animation model may apply animation elements to different subsets of the primitives, and adjust the different subsets of primitives based on animations, movements, adjustments, and/or controls defined for the applied animation elements.

Figure 5:
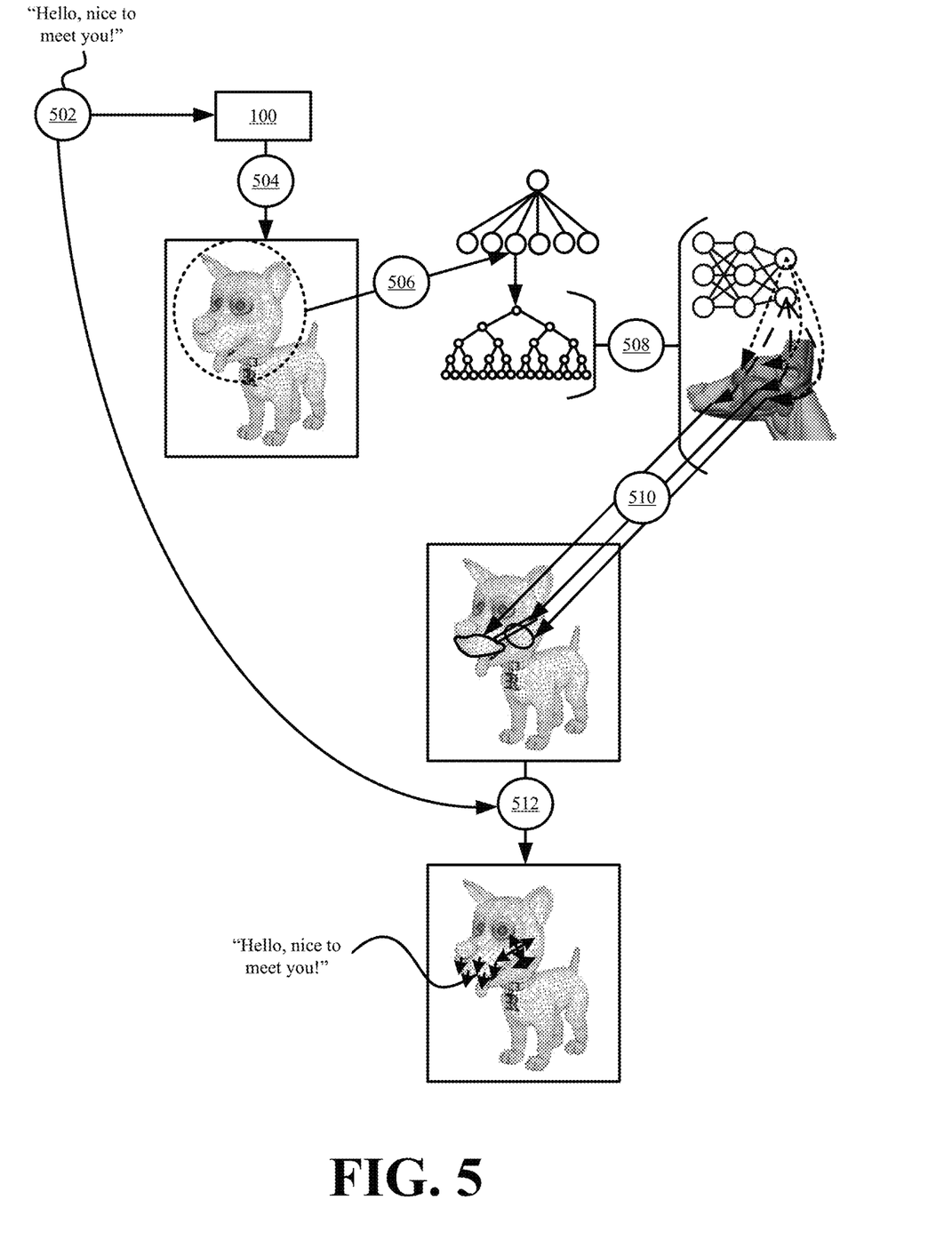
FIG. 5 illustrates an example of accurately animating a particular object in a 3D model by automatically enhancing primitives of the particular object in accordance with some embodiments presented herein.

FIG. 5 illustrates an example of accurately animating a particular object in a 3D model by automatically enhancing primitives of the particular object in accordance with some embodiments presented herein. 3D interactive system 100 detects (at 502) a user interaction for causing a character head or face to speak a specific word or sentence. The user interaction may include a recording of the user speaking the specific word or sentence, and a request to recreate the facial movements of the user on the character head or face. The user interaction may also include an audio recording or textual string with a request for the character head or face to create the facial expressions associated with speaking the words, phrases, or sentences in the audio recording or textual string. In this example, the character is a 3D model of a dog-like character that is animated to speak.

3D interactive system 100 determines (at 504) that the user interaction applies to a set of primitives that form the character head or face. Accordingly, 3D interactive system 100 selects (at 506) the subtree or tree-based representation for the set of primitives that correspond to or define the differentiated character head or face. In other words, 3D interactive system 100 does not select all primitives that form the entirely of the character and does not select primitives for other unaffected interactive components of the character.

3D interactive system 100 obtains (at 508) the animation model that is associated with the set of primitives for the character head or face. The animation model defines different facial animations, movements, adjustments, and/or controls relative to a set of animation elements that represent facial muscles, tendons, and/or other muscular and/or skeletal features of a dog face or head. For instance, different alphabet sounds (e.g., long "a", short "a", "b", "br", "c", "ch", etc.) may be defined according to particular movements of the set of animation elements. In other words, the animation model may model how the set of animation elements move in response to the different alphabet sounds.

3D interactive system 100 enhances (at 510) the set of primitives based on the set of animation elements defined in the animation model. Each animation element of the set of animation elements is defined relative to one or more points of reference. Accordingly, enhancing (at 510) the set of primitives includes determining primitives from the set of primitives that correspond to the animation element points of references, and mapping the animation elements to primitives determined as the points of reference. For instance, the animation model may include an animation element for simulating a jaw or cheek muscle, and the animation element may be defined about specific points of reference on a face. 3D interactive system 100 determines that the primitives map to or are positioned at a same relative position as the specific points of reference, and attaches, connects, or otherwise associates the jaw muscle animation element to the mapped primitives. In some embodiments, the animation elements may also include bones (e.g., a jaw bone) that are first mapped to a subset of the primitives of the character face, and additional animation elements are overlaid or attached relative to the bone animation elements. Enhancing (at 510) the set of primitives therefore includes adding the animation elements from the animation model to mapped or corresponding primitives from the segmented subtree of the 3D model that represents the character head or face.

3D interactive system 100 animates (at 512) the set of primitives by adjusting their positioning, size, orientation, visual characteristics, and/or other properties based on their mapping to the set of animation elements and the set of animation elements adjusting or changing in response to the received user interaction. For instance, primitives that are overlaid, connected, or otherwise associated with an animation element move in relation to the movements that are defined for that animation element in response to the user interaction. Therefore, if a simulated muscle is connected to and placed over a subset of primitives and the user interaction involves speaking a long "o" sound, the subset of primitives move in relation to the simulated muscle modeling movements associated with that muscle being involved in the making of the long "o" sound. Similarly, if the user interaction involves speaking a long "a" sound, the subset of primitives are moved or adjusted in a different manner that follows the simulated muscle modeling movements associated with that muscle being involved in the making of the long "a" sound.

In this manner, 3D interactive system 100 may provide realistic animation to different objects or interactive components without a user defining separate animations for each object or interactive component and/or for every 3D model that is created. 3D interactive system 100 adapts and/or applies the animation model for one object to other representations or models of that object.

Figure 6:
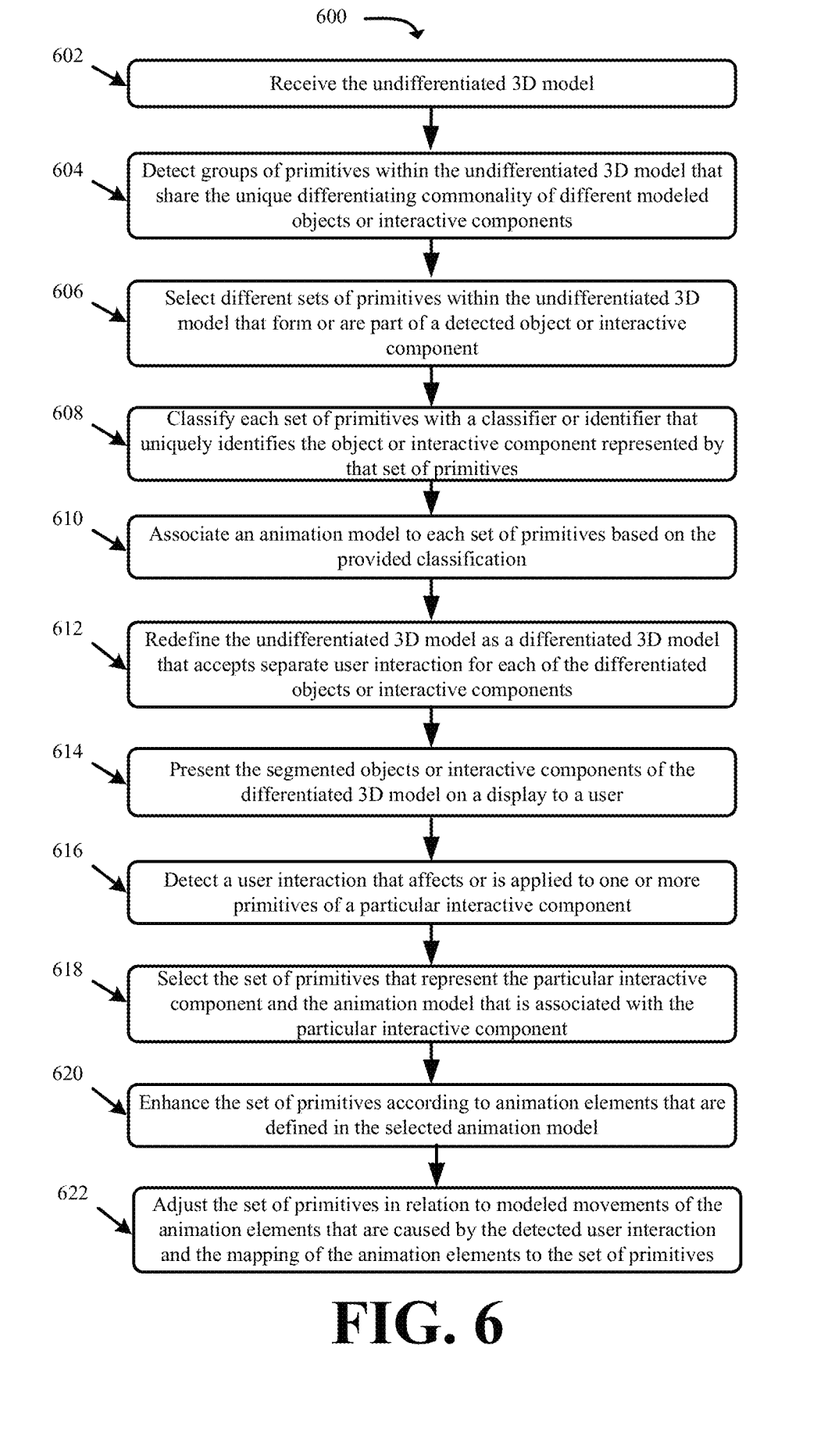
FIG. 6 presents a process for adding interactivity to a 3D model in accordance with some embodiments presented herein

FIG. 6 presents a process 600 for adding interactivity to a 3D model in accordance with some embodiments presented herein. Process 600 is implemented by 3D interactive system 100. 3D interactive system 100 includes one or more devices or machines with processor, memory, storage, network, and/or other hardware resources that are configured or adapted to automatically generate different interactions with different objects or interactive components within an undifferentiated 3D model without human involvement in the object differentiation, primitive segmentation, and/or other animation definition.

Process 600 includes receiving (at 602) the undifferentiated 3D model. The undifferentiated 3D model contains no tags, labels, or other elements to differentiate between the primitives in the 3D model and the different objects or interactive components that those primitives form or represent in the 3D model. The primitives correspond to the building blocks that give the 3D model its 3D shape, form, and visual characteristics. The primitives may include one or more meshes, polygons, points, and/or other building blocks for creating digital 3D object or interactive components in a 3D space or environment with each building block being defined with a position in 3D space and a set of visual characteristics for the visualization of that building block at the specified position in the 3D space.

In some embodiments, the undifferentiated 3D model is generated from scanning or imaging a 3D scene with two or more objects or interactive components. A scanned object may have multiple interactive objects. For instance, the scan of a character may have a hand with each finger of the hand corresponding to a different interactive object.

The scans or images may be processed to generate the undifferentiated 3D model of the 3D scene. For instance, a photogrammetry technique may be used to generate a 3D model from images that capture the 3D scene from different angles or viewpoints. The undifferentiated 3D model may include primitives that accurately recreate the 3D form, shape, and visual characteristics of each object or interactive component. However, the primitives exist as part of the collective 3D model such that the primitives for one object may be intermixed with primitives of another object in the encoding of the undifferentiated 3D model (e.g., the tree-based representation of the 3D model).

Process 600 includes detecting (at 604) groups of primitives within the undifferentiated 3D model that share the unique differentiating commonality of different modeled objects or interactive components. 3D interactive system 100 may use one or more AI/ML techniques or may train a neural network to identify and compile the unique differentiating commonality of the different modeled objects or interactive components by comparing shapes, forms, structures, arrangements, visual characteristics, and/or other features of the objects and interactive components in different images.

Process 600 includes selecting (at 606) different sets of primitives within the undifferentiated 3D model that form or are part of a detected object or interactive component. The detection (at 604) involves identifying one or more subsets of primitives that have the unique positional commonality and/or unique visual characteristic commonality for differentiating a particular object or interactive component from other objects or interactive components. Once the one or more subsets of primitives are identified, 3D interactive system 100 may expand the selection outwards from the subsets of primitives to include other primitives that continue the shape, form, structure, arrangement, visual characteristics, and/or other features of the detected object or interactive component. For instance, 3D interactive system 100 may detect (at 604) a group of primitives that have a unique lattice structure of a particular object. However, the group of primitives do not represent the entirety of the particular object. Accordingly, 3D interactive system 100 selects (at 606) other primitives to add to the group of primitives that complete the full shape and form of the particular object rather than just represent the unique identifying features of the particular object.

Process 600 includes classifying (at 608) each set of primitives with a classifier or identifier that uniquely identifies the object or interactive component represented by that set of primitives. In some embodiments, the classification (at 608) may be based on a classifier or identifier that is associated with the unique differentiating commonality that is used to detect the object or interactive component in the first place. In some embodiments, the classification (at 608) may be performed using object recognition techniques and/or the frequency with which pairs of objects or interactive components are found next to one another. For instance, if 3D interactive system 100 classifies (at 608) a first set of primitives as an arm or limb, the classification (at 608) may be biased so that 3D interactive system 100 searches for and classifies (at 608) a second set of primitives that form a hand of the arm or limb and additional sets of primitives that form fingers of the hand.

Process 600 include associating (at 610) an animation model to each set of primitives based on the provided classification. The associated animation model specifies how the set of primitives classified as a particular object or interactive component moves, adjusts, or changes in response to different user interactions with that particular object or interactive component. In other words, the animation model models different movements or animations of the particular object or interactive component, and applies a particular modeled movement or animation to the represented set of primitives in response to a user interaction that causes the particular modeled movement or animation.

Each animation model may be generated from video or animation samples showing a modeled movement or animation of the represented object or interactive component caused by a particular user interaction. Animation models may be defined from or adapted from animations of similar or related objects or interactive objects. For instance, an animation model may be generated to model the walking of a first character. That same animation model may be adapted and applied to animate the walking of a different second character that has similarly proportioned limbs. Similarly, videos of humans speaking or expressing different emotions may be used to generate a facial animation model, and the facial animation model may be adapted and applied to animate faces of digitally created characters, non-human characters, and/or models of different human faces.

Process 600 includes redefining (at 612) the undifferentiated 3D model as a differentiated 3D model that accepts separate user interaction for each of the differentiated objects or interactive components. Redefining (at 612) the undifferentiated 3D model may include generating a mutable tree that represents the entirely of the 3D model. The mutable tree may include nodes that correspond to the root node of separate subtrees. Each subtree may be a tree-based representation for the set of primitives that make up a different detected and/or differentiated object or interactive component within the 3D model. In other words, 3D interactive system 100 segments the single monolithic 3D model into multiple 3D models of different objects or interactive components that are automatically detected within the single monolithic 3D model. Moreover, each subtree may be associated with its own animation model for modeled movements of the represented object or interactive component rather than a single animation model that attempts to model all movements of all objects or interactive objects in the 3D model.

Process 600 includes presenting (at 614) the segmented objects or interactive components of the differentiated 3D model on a display to a user. Presenting (at 614) the segmented objects or interactive components may include rendering the primitives of the differentiated 3D model to generate visual representations of each object or interactive component from the 3D model. The visual representations may be displayed in a virtual reality, mixed reality, augmented reality, or other spatial computing environment. In other words, the visual representation may be presented in a two-dimensional or three-dimensional display.

Process 600 includes detecting (at 616) a user interaction that affects or is applied to one or more primitives of a particular interactive component. For instance, the user may virtually touch the particular interactive component in a virtual reality, mixed reality, augmented reality, or other spatial computing environment. The user may also programmatically specify input for interacting with or animating the particular interactive component. For instance, the user may provide input to cause a character to run or speak user provided words.

Process 600 includes selecting (at 618) the set of primitives that represent the particular interactive component from the differentiated 3D model, and selecting the animation model that is associated with the particular interactive component. The selection (at 618) occurs with minimal processing effort as the one or more primitives affected by the user interaction will be part of the subtree that encompasses the set of primitives that represent the particular interactive component.

Process 600 includes enhancing (at 620) the set of primitives according to animation elements that are defined in the selected (at 618) animation model. Enhancing (at 620) the set of primitives includes adding, overlaying, connecting, and/or otherwise associating elements that accurately create or model a desired movement or animation to different subsets of the set of primitives. The animation elements may specify complex controls for the adjustment of the subsets of primitives in response to the user interaction. For instance, a simple animation may involve moving the set of primitives together without changing the spacing or distance between any of the primitives or the sizing of any of the primitives. This is often the movement that is associated with moving the set of primitives in relation to a movement that is defined for a bone of an animation framework. However, the animation elements may introduce complexity and variations in this movement by applying muscles that expand and contract in different ways to the bone or the set of primitives. Moreover, simulated skin may be applied so that the movement of primitives mimics the stretching and elasticity of skin. By enhancing (at 620) the set of primitives with these animation elements, the spacing or distance between a subset of the primitives and/or the sizing of the primitives may change to more accurately adjust the primitives according to specific muscle contractions, and the primitives corresponding to the surface of the interactive component may be adjusted according to the stretching and elasticity that is modeled for applied skin animation element. Other animation elements in the animation models may include and simulate movement of hair, water, plants, gases, specific materials (e.g., rubber, fabric, wood, etc.), and the like.

Process 600 includes adjusting (at 622) the set of primitives in relation to modeled movements of the animation elements that are caused by the detected user interaction and the mapping of the animation elements to the set of primitives. In this manner, the user interaction creates a realistic and lifelike effect on the interactive component without the user having to manually select or define the interactive component or the animation of the interactive component. For instance, if the user interaction causes a character to speak a specific set of words, the set of primitives are not adjusted in the same way (e.g., up and down) for each word. Instead, the animation elements model muscle, tendon, skin, and/or other movements associated with the speaking of different words, and these movements are mapped to different subsets of primitives that are aligned or linked to those animation elements in order to create different movements of the character mouth and face that mimic movements of the human mouth and face when speaking those same words.

Figure 7:
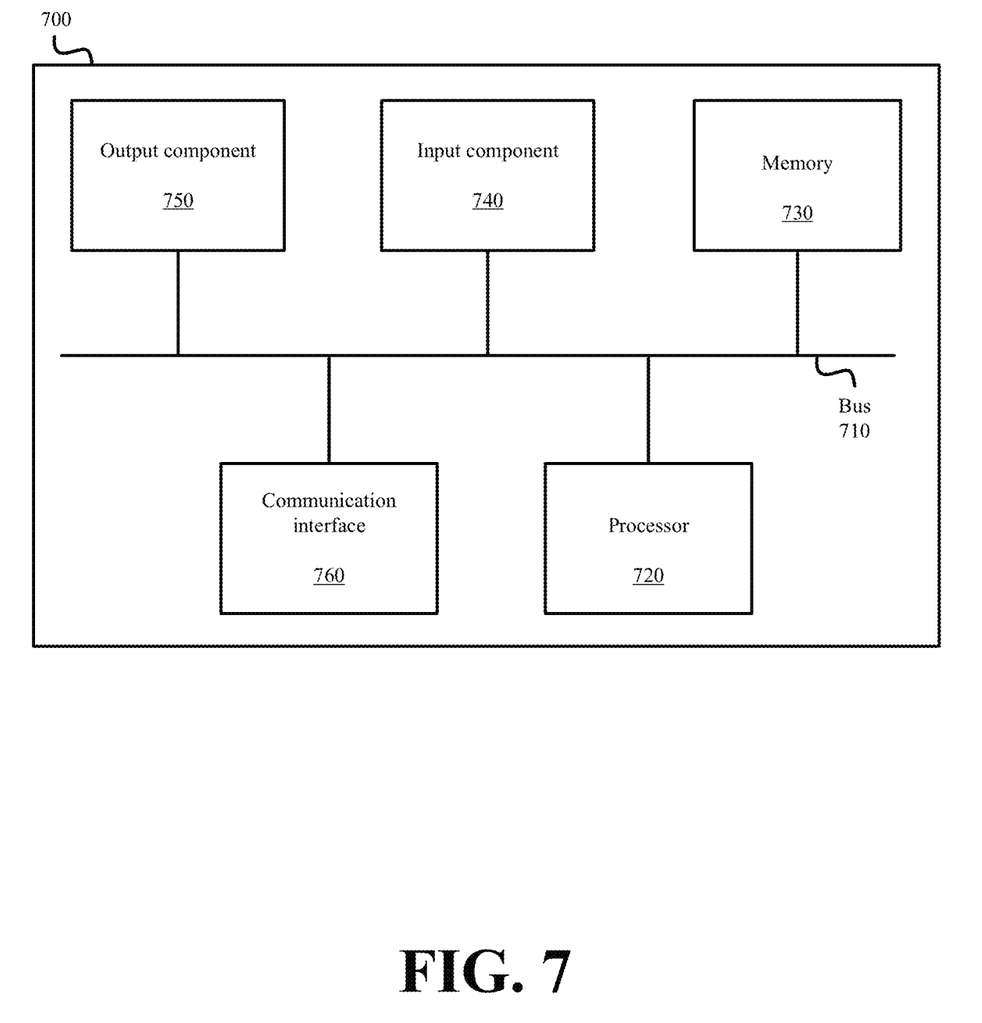
FIG. 7 illustrates example components of one or more devices, according to one or more embodiments described herein.

FIG. 7 is a diagram of example components of device 700. Device 700 may be used to implement one or more of the tools, devices, or systems described above (e.g., 3D interactive system 100). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method performed by a three-dimensional (3D) interactive system for automatically adding interactivity to a 3D model, the method comprising:
   receiving, at the 3D interactive system, the 3D model comprising a plurality of primitives that collectively form two or more objects in a 3D scene, wherein the plurality of primitives of the 3D model are defined without a classification or a differentiation of different surfaces, objects, or features that different groups of primitives from the plurality of primitives represent;
   selecting, by execution of one or more hardware processors of the 3D interactive system, different sets of primitives from the plurality of primitives based on detected commonality between each of the different set of primitives and a different object;
   defining, by execution of the one or more hardware processors, a different classification for each set of the different sets of primitives that represent a different object based on the detected commonality with that different object;
   retrieving, by execution of the one or more hardware processors, an animation model comprising one or more animations of the different object that is represented by a particular set of primitives from the different sets of primitives in response to a user interaction that is applied to one or more primitives of the particular set of primitives and further in response to the animation model and the particular of primitives being associated with a particular classification; and
   animating, by execution of the one or more hardware processors, the particular set of primitives according to an animation defined in the animation model for the user interaction.

2. The method of claim 1 further comprising:
   analyzing a plurality of sample images that capture different representations of different objects;
   determining different structural or visual characteristic commonality associated with each of the different objects based on a repeating structural or visual characteristic commonality in sample images of one object that is not found in sample images of other objects; and
   wherein selecting the different sets of primitives comprises determining one or more of a shape, form, or visual characteristics formed by different groups of the plurality of primitives that match the different structural or visual characteristic commonality associated with a different object of the different objects.

3. The method of claim 1, wherein defining the different classification comprises:
tagging each primitive from a set of primitives with a classifier that identifies an object represented by that set of primitives.

4. The method of claim 1 further comprising:
associating a different animation model from a plurality of animation models to each set of primitives from the different sets of primitives based on the different classification that is defined for that set of primitives.

5. The method of claim 1 further comprising:
generating a plurality of animation models based on animation samples of a plurality of objects, wherein each animation model comprises one or more animations for each object of the plurality of objects.

6. The method of claim 1,
wherein receiving the 3D model comprises:
receiving a single tree-based representation for the plurality of primitives; and
wherein defining the different classification comprises:
defining a subtree for each of the different sets of primitives; and
defining a tree with nodes linking to each subtree.

7. The method of claim 1, wherein the plurality of primitives comprises polygons, meshes, or points that collectively generate shapes and visual characteristics of the two or more objects.

8. The method of claim 1 further comprising:
selecting the animation model that is associated with the particular classification defined for the particular set of primitives; and
mapping the animation that is specified in the animation model for the different object identified with the particular classification to the particular set of primitives.

9. The method of claim 8, wherein mapping the animation comprises:
determining primitives of the particular set of primitives that are points of reference for animation elements of the animation model that change during the animation;
mapping the animation elements to different subsets of primitives from the particular set of primitives based on the points of reference; and
applying changes that are made to the animation elements during the animation to the different subsets of primitives based on the mapping of the animation elements to the different subsets of primitives.

10. The method of claim 1 further comprising:
detecting that the user interaction is applied to the one or more primitives of the particular set of primitives and one or more primitives of a second set of primitives from the different sets of primitives with a second classification that is different than the particular classification defined for the particular set of primitives; and
animating the second set of primitives differently than the particular set of primitives based on animations defined in an animation model for the different object identified with the second classification differing from animations defined in the animation model for the different object identified with the particular classification.

11. The method of claim 1 further comprising:
detecting a different second user interaction that applies to one or more primitives of a second set of primitives from the different sets of primitives with a second classification that is different than the particular classification defined for the particular set of primitives; and
animating the second set of primitives without changing the particular set of primitives in response to the different second user interaction being applied to the one or more primitives of the second set of primitives.

12. A three-dimensional (3D) interactive system for automatically adding interactivity to a 3D model, the 3D interactive system comprising:
one or more hardware processors configured to:
receive the 3D model comprising a plurality of primitives that collectively form two or more objects in a 3D scene, wherein the plurality of primitives of the 3D model are defined without a classification or a differentiation of different surfaces, objects, or features that different groups of primitives from the plurality of primitives represent;
select different sets of primitives from the plurality of primitives based on detected commonality between each of the different set of primitives and a different object;
define a different classification for each set of the different sets of primitives that represent a different object based on the detected commonality with that different object;
retrieve an animation model comprising one or more animations of the different object that is represented by a particular set of primitives from the different sets of primitives in response to a user interaction that is applied to one or more primitives of the particular set of primitives and further in response to the animation model and the particular set of primitives being associated with a particular classification; and
animate the particular set of primitives according to an animation defined in the animation model for the user interaction.

13. The 3D interactive system of claim 12, wherein the one or more hardware processors are further configured to:
analyze a plurality of sample images that capture different representations of different objects;
determine different structural or visual characteristic commonality associated with each of the different objects based on a repeating structural or visual characteristic commonality in sample images of one object that is not found in sample images of other objects; and
wherein selecting the different sets of primitives comprises determining one or more of a shape, form, or visual characteristics formed by different groups of the plurality of primitives that match the different structural or visual characteristic commonality associated with a different object of the different objects.

14. The 3D interactive system of claim 12, wherein defining the different classification comprises:
tagging each primitive from a set of primitives with a classifier that identifies an object represented by that set of primitives.

15. The 3D interactive system of claim 12, wherein the one or more hardware processors are further configured to:
associate a different animation model from a plurality of animation models to each set of primitives from the different sets of primitives based on the different classification that is defined for that set of primitives.

16. The 3D interactive system of claim 12, wherein the one or more hardware processors are further configured to:

generate a plurality of animation models based on animation samples of a plurality of objects, wherein each animation model comprises one or more animations for each object of the plurality of objects.

17. The 3D interactive system of claim 12, wherein receiving the 3D model comprises:
   receiving a single tree-based representation for the plurality of primitives; and
   wherein defining the different classification comprises:
   defining a subtree for each of the different sets of primitives; and
   defining a tree with nodes linking to each subtree.

18. The 3D interactive system of claim 12, wherein the one or more hardware processors are further configured to:
   select the animation model that is associated with the particular classification defined for the particular set of primitives; and
   map the animation that is specified in the animation model for the different object identified with the particular classification to the particular set of primitives.

19. The 3D interactive system of claim 18, wherein mapping the animation comprises:
   determining primitives of the particular set of primitives that are points of reference for animation elements of the animation model that change during the animation;
   mapping the animation elements to different subsets of primitives from the particular set of primitives based on the points of reference; and
   applying changes that are made to the animation elements during the animation to the different subsets of primitives based on the mapping of the animation elements to the different subsets of primitives.

20. A non-transitory computer-readable medium storing instructions for automatically adding interactivity to a three-dimensional (3D) model that, when executed by one or more processors of a 3D interactive system, cause the 3D interactive system to perform operations comprising:
   receiving the 3D model comprising a plurality of primitives that collectively form two or more objects in a 3D scene, wherein the plurality of primitives of the 3D model are defined without a classification or a differentiation of different surfaces, objects, or features that different groups of primitives from the plurality of primitives represent;
   selecting different sets of primitives from the plurality of primitives based on detected commonality between each of the different set of primitives and a different object;
   defining a different classification for each set of the different sets of primitives that represent a different object based on the detected commonality with that different object;
   retrieving an animation model comprising one or more animations of the different object that is represented by a particular set of primitives from the different sets of primitives in response to a user interaction that is applied to one or more primitives of the particular set of primitives and further in response to the animation model and the particular set of primitives being associated with a particular classification; and
   animating the particular set of primitives according to an animation defined in the animation model for the user interaction.

* * * * *